United States Patent [19]
Boutet

[11] Patent Number: 4,743,759
[45] Date of Patent: May 10, 1988

[54] LIGHT COLLECTOR FOR PHOTO-STIMULABLE PHOSPHOR IMAGING SYSTEM

[75] Inventor: John C. Boutet, Rochester, N.Y.

[73] Assignee: Eastman Kodak Company, Rochester, N.Y.

[21] Appl. No.: 917,936

[22] Filed: Oct. 14, 1986

[51] Int. Cl.⁴ ............................................ G01T 1/105
[52] U.S. Cl. .................. 250/327.2; 250/228; 250/484.1
[58] Field of Search ................. 250/327.2, 484.1, 228; 350/174, 96.28; 356/431

[56] References Cited

U.S. PATENT DOCUMENTS

| | | | |
|---|---|---|---|
| Re. 31,847 | 3/1985 | Luckey | 250/327.2 |
| 3,670,157 | 6/1972 | Bragg | 362/283 |
| 4,321,630 | 3/1982 | Kramer | 358/294 |
| 4,346,295 | 8/1982 | Tanaka et al. | 250/327.2 |
| 4,453,180 | 6/1984 | Juergensen | 358/75 |
| 4,568,984 | 2/1986 | Juergensen et al. | 358/293 |
| 4,629,890 | 12/1986 | Goto et al. | 250/327.2 |

FOREIGN PATENT DOCUMENTS

0137674  8/1984  European Pat. Off.
0142833 11/1984  European Pat. Off.

OTHER PUBLICATIONS

D. H. Cronquist, "Hollow Reflecting Light Collector Tube", *IBM Technical Disclosure Bulletin*, vol. 17, No. 3, (Aug., 1974), p. 966.

Primary Examiner—Janice A. Howell
Assistant Examiner—Constantine Hannaher
Attorney, Agent, or Firm—Thomas H. Close

[57] ABSTRACT

A light collector for collecting and detecting light emitted from a photo-stimulable phosphor sheet in a photo-stimulable phosphor imaging system includes a roof-mirror light collector having a bottom roof-mirror extending the width of the photo-stimulable phosphor sheet, and a top roof-mirror positioned over the bottom roof-mirror to define a mirror box having a nearly square cross-section. The roof-mirrors define slots along their peaks for passing a scanning beam of stimulating radiation through the light box to the surface of the photo-stimulable phosphor sheet, and for admitting emitted light from the photo-stimulable phosphor sheet into the light box. Prestimulation in such a light collector is reduced by making the slot adjacent the photo-stimulable phosphor sheet equal to or narrower than the opposite slot. Predischarge in a light collector is reduced by providing a light trap adjacent the slot that is positioned near the surface of the photo-stimulable phosphor sheet.

5 Claims, 9 Drawing Sheets

LIGHT COLLECTOR FOR PHOTO-STIMULABLE PHOSPHOR IMAGING SYSTEM

TECHNICAL FIELD

The invention relates to apparatus for reading out the image stored in a photo-stimulable phosphor image recording medium, and more particularly to apparatus for collecting and detecting the radiation emitted from the photo-stimulable phosphor in response to interrogation by stimulating radiation.

BACKGROUND ART

In a photo-stimulable phosphor imaging system, as described in U.S. Pat. No. Re. 31,847 reissued Mar. 12, 1985 to Luckey, a photo-stimulable phosphor sheet is exposed to an imagewise pattern of short wavelength radiation, such as x-radiation, to record a latent image pattern in the photo-stimulable phosphor sheet. The latent image is read out by stimulating the phosphor with a relatively long wavelength stimulating radiation, such as red or infrared light. Upon stimulation, the photo-stimulable phosphor releases emitted radiation of an intermediate wavelength, such as blue or violet light, in proportion to the quantity of short wavelength radiation that was received. To produce a signal useful in electronic image processing, the photo-stimulable phosphor sheet is scanned in a raster pattern by a beam of light produced for example by a laser deflected by an oscillating or rotating scanning mirror, and the emitted radiation is sensed by a photodetector such as a photomultiplier tube to produce the electronic image signal.

In one type of scanning apparatus, the photo-stimulable phosphor sheet is placed on a translation stage, and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photodetector. While the apparatus employed to collect the light may take various forms, one form of light collector is proposed in U.S. Pat. No. 4,346,295, issued Aug. 24, 1982, to Tanaka et al. The light collector proposed by Tanaka et al comprises a sheet of light transmitting material that is flat on one end, and rolled into an annular shape on the opposite end. The flat end of the light collector is positioned adjacent to the scan line on the photo-stimulable phosphor sheet. The light receiving face of a photomultiplier tube is placed against the annular end of the light collector.

Light emitted from the phosphor sheet enters the flat end of the light collector and is light piped to the photomultiplier tube. Improved light collection efficiencies are achieved by having two such light collectors one on each side of the scan line, or by placing a long narrow reflector opposite the flat end of the light collector to increase the collection window of the light collector. The transparent light collector has the drawback that it is inherently complicated to manufacture. Furthermore, the collection efficiency of transparent light guides is limited due to their absorption in the wavelength range of light emitted by the photo-stimulable phosphors (e.g. blue-violet).

Figure 3:
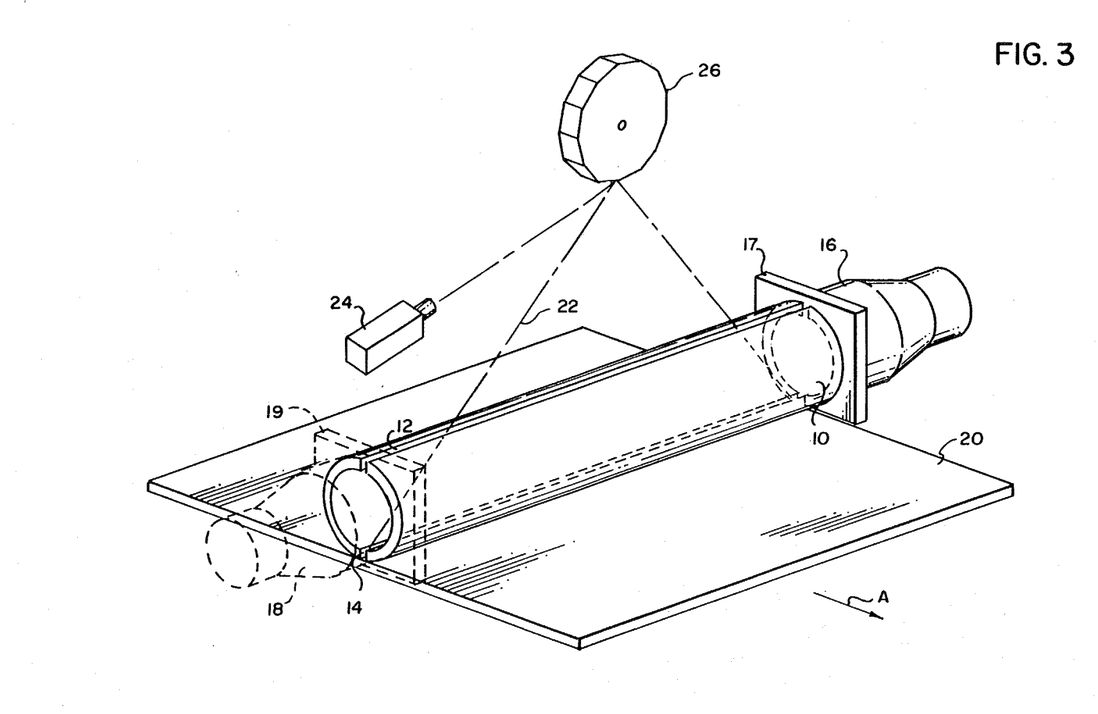
FIG. 3 is a perspective view of a cylindrical integrating light collector useful in describing the background of the present invention.

In an attempt to provide an easily manufacturable, high collection efficiency light collector, a cylindrical integrating cavity light collector was constructed and tested. The cylindrical integrating cavity light collector, as shown in FIG. 3, comprises a hollow cylindrical light collection enclosure 10 having a pair of parallel slits 12 and 14 arranged opposite from one another along the axis of the cylinder. The inside of the cylinder was painted with a white diffusely reflective paint, and the light receiving surfaces of a pair of photomultiplier tubes 16 and 18 were positioned at each end of the cylinder. The light collector was positioned near the photo-stimulable phosphor sheet 20 and a laser beam 22 produced by a laser 24 was directed through the two parallel slits 12 and 14 to stimulate the phosphor sheet 20. The beam was scanned in a line scan direction by rotating a polygon mirror 26, and the photo-stimulable phosphor was scanned in a page scan direction by transporting the phospshor sheet 20 in the direction of arrow A by a translation stage not shown.

Light that was emitted from the phosphor upon stimulation, entered the collector from the bottom slit 14, and after a number of diffuse reflections from the inside wall of the cylinder, reached one of the photomultiplier tubes at the end of the cylinder. Filters 17 and 19 were placed over the faces of the photomultiplier tubes to absorb any of the stimulating radiation from the laser before reaching the photomultiplier tubes.

Figure 4A:
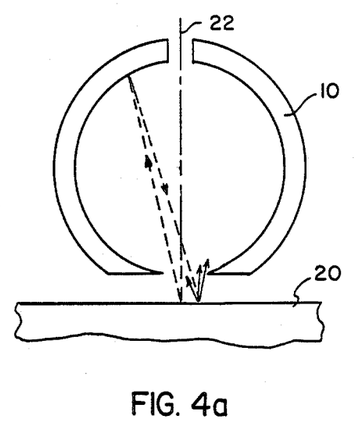
FIGS. 4A and 4B are cross-sectional views of the cylinrical integrating light collector useful in describing the background of the present invention.
Figure 4B:
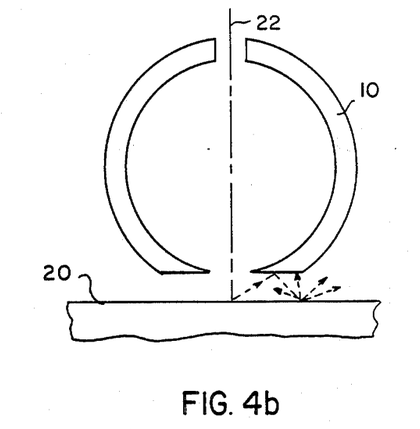

Experimental studies conducted with the cylindrical integrating light collector having diffusely reflective internal surfaces, identified a further factor that has an effect on the signal-to-noise ratio achievable with the photo-stimulable phosphor imaging apparatus. FIG. 4 shows a cross-section of the cylindrical integrating light collector useful in describing this factor. It was discovered that as the photo-stimulable phosphor sheet is scanned by the laser beam 22, a high percentage (up to 90%) of the stimulating radiation from the laser beam is reflected from the surface of photo-stimulable phosphor 20. If this reflected stimulating radiation is subsequently reflected to the surface of the photo-stimulable phosphor in a region outside the immediate scanning location, an untimely and undesirable stimulation of the phosphor takes place. The reflected stimulating radiation which is reflected back to the phosphor is called "flare."

This undesirable stimulation of the phosphor can occur within the collection window of the light collector as illustrated in FIG. 4A, or outside of the collection window of the light collector as illustrated in FIG. 4B. In the first case, illustrated by FIG. 4A the flare induced emission of light that is collected by the collector will be referred to as prestimulation. The prestimulation light is directed to the photomultiplier tubes and produces an additional component to the image signal. This signal component causes degradations in the image including a reduction in the contrast of images by prestimulation of high exposure areas and by the addition of unwanted signal to low exposure areas. Furthermore, "shadowy" types of artifacts are produced when an image in the form of a high exposure object on a low exposure background field is scanned. The signal-to-noise ratio in all image areas is degraded by flare induced emission, especially in regions of low x-ray exposure which are surrounded by high exposure regions. Also, the effect of laser noise is enhanced since a large area of the phosphor is exposed to a low level of stimulating intensity. The luminescence from this area will follow the fluctuations in laser power.

Where the undesirable flare induced emission occurs outside the collection window, upstream of the scan line, it is called predischarge. Predischarge occurs where reflected stimulating radiation is re-reflected from the underside of the light collector back onto the surface of the phosphor sheet 20 in the region upstream of the collection window of the light collector as illustrated in FIG. 4B. Although the emitted light produced by predischarge is not collected, and therefore does not directly appear in the image signal produced by the photodetector, the effect of predischarge reduces the signal level of the image and therefore lowers the overall signal-to-noise ratio achievable by the apparatus.

Figure 5:
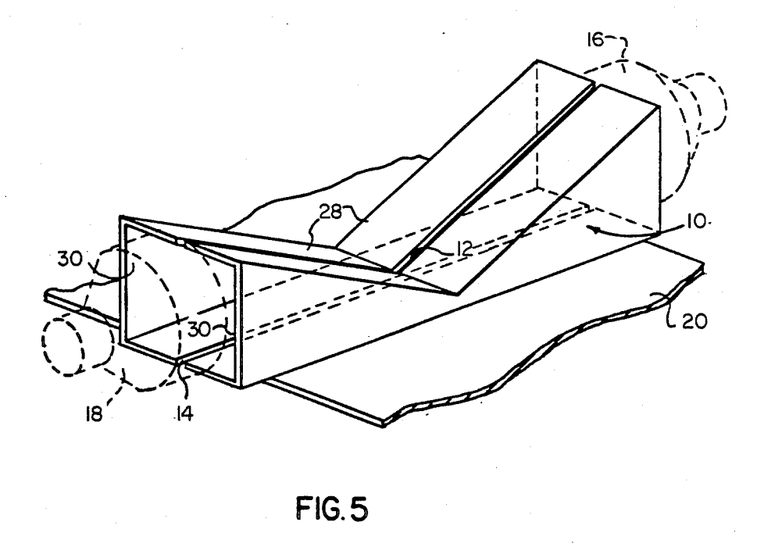
FIG. 5 is a perspective view of a V-mirror box light collector useful in describing the background of the present invention.

In an effort to improve collection efficiency and decrease prestimulation by reducing the number of internal reflections occurring inside the light collector, a V-mirror box light collector was designed having specularly reflective interior walls, and being tapered from the center toward the photomultiplier tubes located at both ends of the box. This V-mirror box collector is shown in FIG. 5. The V-mirror box collector is shown in FIG. 5. The V-mirror box collector was essentially a rectangular mirror box 10 tapered from a rectangular cross-section at the center to a square cross-section at each end, by sloping the top mirrors 28 toward the center. The bottom mirror 30 is flat and parallel with the surface of phosphor sheet 20.

Figure 6:
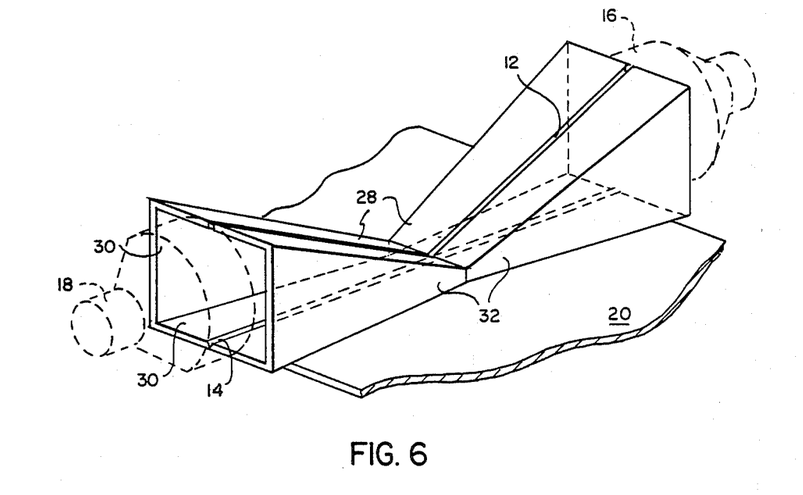
FIG. 6 is a perspective view of a double V-mirror box light collector useful in describing the background of the present invention.

In a furher refinement of the V-mirror box collector, shown in FIG. 6, the V-mirror box was tapered in two dimensions to further reduce the number of internal reflections, to thereby further improve the collection efficiency of the collector and further reduce prestimulation. The double V-mirror box light collector was essentially a rectangular mirror box tapered from a small rectangular cross-section in the center to a larger square cross-section at the ends by sloping the top mirrors 28 and the side mirrors 32 toward the center. The bottom mirror 30 remains flat and parallel with the surface of phosphor sheet 20.

To achieve optimum light collection, the bottom slit 14 must be as close to the light emitting surface of the photo-stimulable phosphor sheet 20 as possible and the bottom mirror 30 of the V-mirror box light collector must be as thin as possible. Furthermore, to reduce predischarge, the bottom of the V-mirror box light collector may be coated with a nonreflective coating so that stimulating light escaping beneath the bottom slot is not reflected back on to the surface of the phosphor sheet. Matte black finishes have the disadvantage that their reflective properties are drastically changed by contact and abrasion with other surfaces, which is likely to occur due to the extremely close position tolerance of the light collector to the surface of the phosphor. The specular reflectivity of surfaces such as smooth black anodized surfaces, is too high to be desirable.

These requirements make the double V-box light collector difficult to manufacture and use, although it provides a substantial improvement in light collection efficiency and reduction in prestimulation over light collectors of the light guide type.

It is the object of the invention therefore to provide improvements in light collectors for photo-stimulable phosphor imaging apparatus having high light collection efficiency, ease of manufacture, and low prestimulation and predischarge.

DISCLOSURE OF THE INVENTION

According to a first aspect of the present invention, high light collection efficiency and ease of manufacturability is obtained in a mirror box light collector having a bottom roof-mirror (a right angle pair of mirrors with the peak near the surface of the stimulable phosphor sheet) extending the width of the photo-stimulable phosphor sheet, and defining a slot along the peak of the roof for passing a scanning beam to the surface of the photo-stimulable phosphor sheet and for allowing light emitted by the photo-stimulable phosphor sheet to enter the collector. A top roof-mirror is positioned over the bottom roof mirror with its peak pointing away from the peak of the bottom roof-mirror to define a mirror box having a nearly square cross-section. The top roof-mirror defines a slot along its peak, with its centerline coplanar with the centerline of the slot in the bottom roof-mirror. The top and bottom roof-mirrors are tapered such that the nearly square cross-section is largest at at least one end of the mirror box. A photodetector having a light receiving face located at the large end of the mirror box receives light emitted by the stimulable phosphor sheet and generates an electrical signal in response.

In a preferred embodiment of the invention, the mirror box is tapered towards the middle from both ends such that the square cross-section is smallest at the middle and largest at the ends. The peak of the bottom roof-mirror defines a straight line, and the peaks of the top roof-mirrors define a "V" angle.

According to a further aspect of the present invention, prestimulation is reduced in the roof-mirror light collector by making the slot in the top roof-mirror equal to or greater in width than the slot in the bottom roof-mirror slot, thereby insuring that stimulating radiation reflected from the surface of the photo-stimulable phosphor sheet is not redirected to the surface of the sheet in a region of the phosphor sheet away from the instantaneous scanning location by retro-reflection from the top roof-mirror.

According to a further aspect of the present invention, predischarge is reduced in a light collector by providing a light trap for trapping light reflected from the photo-stimulable phosphor onto the external surface of the light collector.

BRIEF DESCRIPTION OF THE DRAWINGS

The invention is described with reference to the accompanying drawings wherein identical or analogous features in the drawings are similarly numbered.

MODES OF CARRYING OUT THE INVENTION

Figure 1:
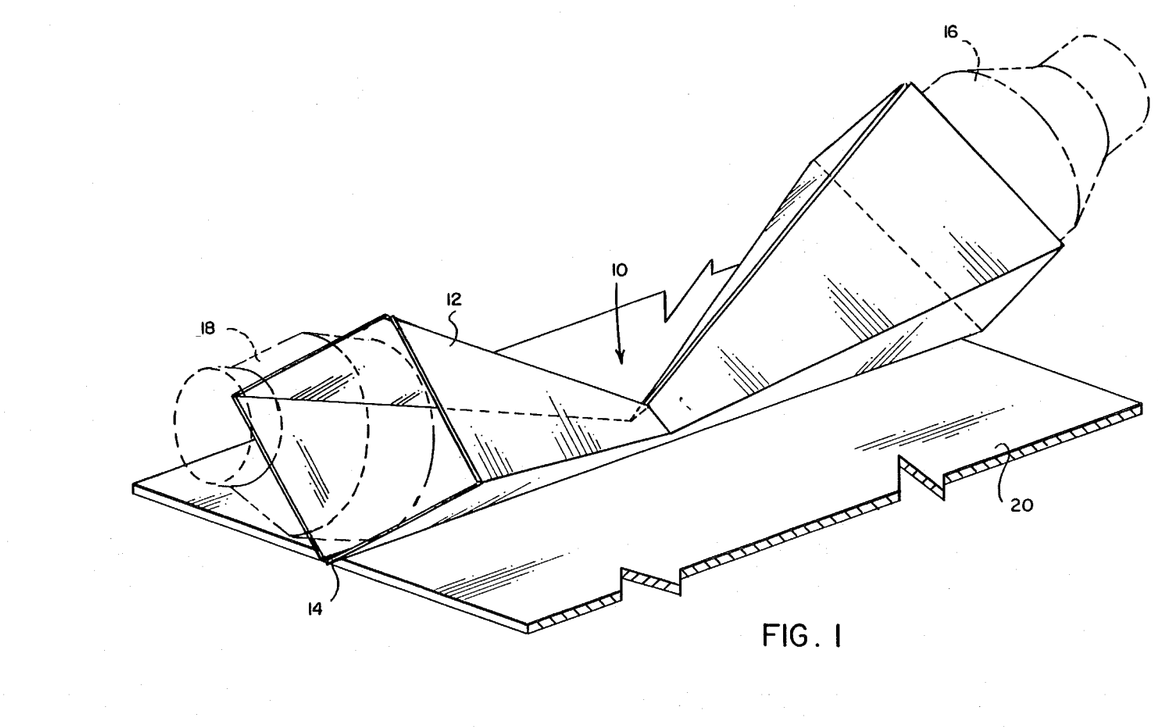
FIG. 1 is a perspective view illustrating a V-roof mirror light collector according to a preferred mode of carrying out the present invention.
Figure 2:
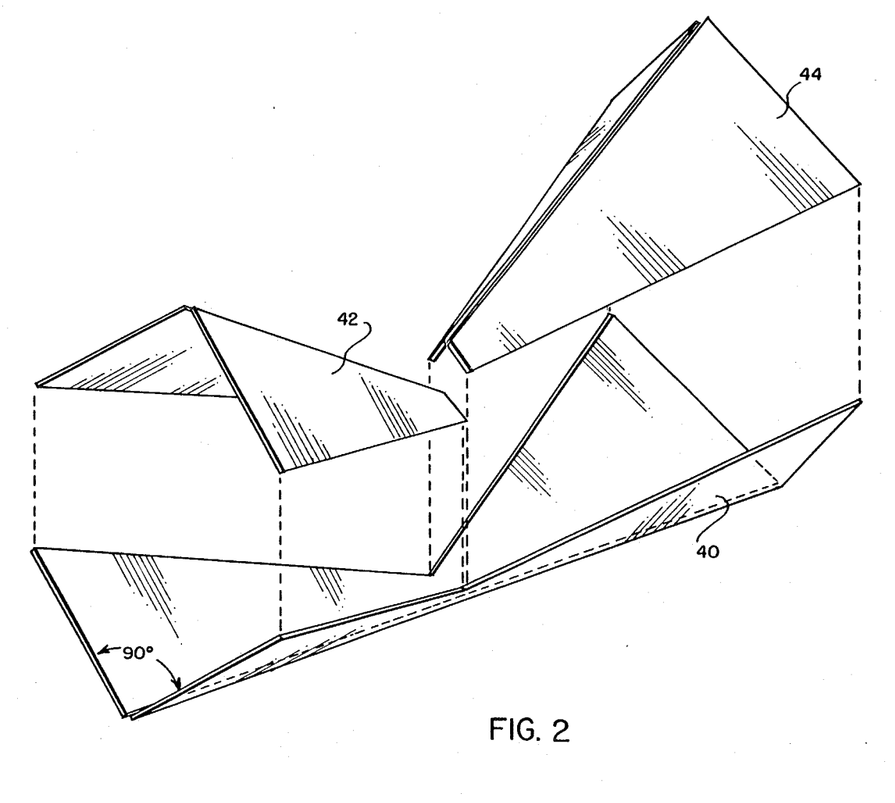
FIG. 2 is an exploded perspective view of the V-roof mirror light collector shown in FIG. 1.

Referring now to FIG. 1, a V-roof mirror light collector according to the present invention will be described. The V-roof mirror light collector generally designated 10 in FIG. 1 is composed of three 90° roof mirrors, each of which defines a slot along its peak. FIG. 2 shows the V-roof mirror light box collector in exploded perspective. The bottom roof mirror 40 runs the full length of the collector and faces up. Each of the two top roof-mirrors 42 and 44 is about one-half the length of the bottom roof-mirror and faces down. The top roof-mirrors are tapered from one end to the other, with the large ends arranged toward the outside ends of the light collector. The sides of the bottom roof-mirror 40 are tapered toward the middle of the light collector. The roof mirrors are assembled in a frame, not shown, to establish their spatial relation to one another. Photomultiplier tubes 16 and 18 (see FIG. 1) are arranged with their light receiving faces adjacent the open ends of the V-roof mirror light collector 10.

A V-roof mirror light collector was constructed for scanning a 35 cm wide photo-stimulable phosphor sheet. The V-roof mirror light collector was 38 cm long, and 10 cm square at the open ends. Photomultiplier tubes having a 12.5 cm diameter light receiving face were used with the light collector. The individual plane mirrors used to construct the V-roof mirror light collector were aluminum plates with diamond machined reflective surfaces. The diamond machined mirror surfaces were 90% specular reflective at 400 nm, the wavelength of the emitted light from the photo-stimulable phosphor sheet.

Figure 7:
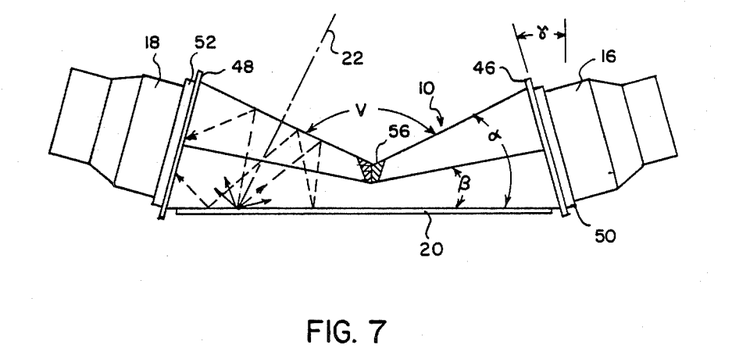
FIG. 7 is a side view of the V-roof mirror light collector shown in FIG. 1.

FIG. 7 shows a side view of the V-roof mirror light collector. The slope of the peaks of the top roof-mirrors, as indicated by the angle a, is 38° to the plane of the stimulable phosphor sheet. The planes of intersection of the top and bottom roof-mirrors are at an angle $\beta$ of 19° to the plane of the stimulable phosphor sheet. The ends of the V-roof mirror light collector are inclined by an angle $\gamma$ of 15° from the vertical. This permitted a reduced "V"-angle (see FIG. 7) for use with the 12.5 cm diameter photomultiplier tubes and resulted in improved collection efficiency by reducing the number of internal reflections some of the rays experienced to reach the photomultiplier tubes. It should be noted however, that this tilting permitted direct reflection from the photomultiplier tube faces to the phosphor surface, which caused a slight increase in prestimulation.

Circular masks 46 and 48 having an 11.25 cm diameter circular aperture were provided at the end of the light receiving faces of the photomultiplier tubes, and infrared filters 50 and 52 were provided over the light receiving faces of the photomultiplier tubes to absorb the reflected infrared radiation from the scanning laser beam 22.

The V-roof mirror light collector was mounted so that the widths of the top and bottom slots 12 and 14 could be independently adjusted. It was discovered that the top slot 12 must be at least as wide as the bottom slot 14 to achieve high efficiency light collection with low flare. If the top slot 12 is narrower than the bottom slot 14, stimulating light reflected directly upward from the phosphor near the edge of the bottom slot will be retro-reflected by the top roof mirror back through the bottom slot onto the surface of the phosphor. If the top slot is equal in width to the bottom slot, most prestimulation due to this effect is eliminated. With equal top and bottom slot widths of 0.25 cm, and the photomultiplier tubes in place, the measured prestimulation was 0.2%. This compares to a measured prestimulation of 5% with the cylindrical collector shown in FIG. 3. To further reduce prestimulation, and enhance collection efficiency of the light collector, the infrared filter 50 and 52 may be provided with an antireflection coating.

Figure 8:
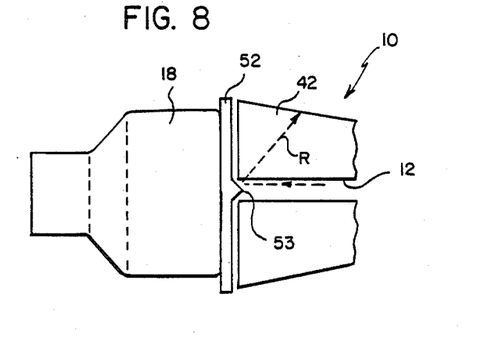
FIG. 8 is a partial top view of the light collector shown in FIG. 1.

A further marginal reduction in prestimulation is achieved by providing a crest on the filters 50 and 52, or on a cover plate bonded to the face of the filters. The peak of the crest is arranged to lie in the same plane as the peaks of the roof mirrors, so that rays of stimulating light that are reflected off the face of the filters will be deflected to the sides of the mirror box, and not back through the bottom slot to the surface of the stimulable phosphor. FIG. 8 is a partial top view of the roof mirror light collector, showing the location of the crest 53 on the filter 52. A ray R of the stimulating light that is reflected from the surface of the filter is deflected to the sides of the light box.

Figure 9:
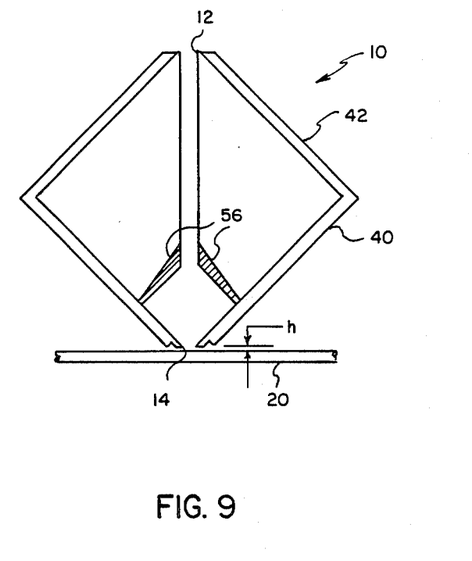
FIG. 9 is an end view of the V-roof mirror light collector shown in FIG. 1.

FIG. 9 shows an end view of the V-roof-mirror light collector. Since the amount of emitted light that escapes under the collector is a function of the elevation h of the collector over the surface of the phosphor sheet 20, h is kept as small as possible without actually contacting the surface of the phosphor sheet with the knife edges of slot 14. A feeler gauge was used to adjust the height h to 0.03 cm. At this height the maximum escape angle from the center of a 0.25 cm wide slot is 13.5°.

Figure 11:
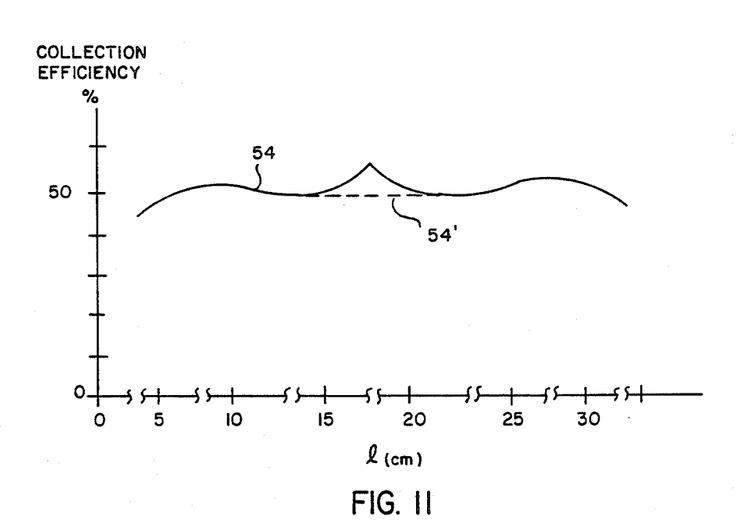
FIG. 11 is a graph of light collection efficiency versus scan line position for a V-roof mirror light collector shown in FIG. 2.

The light collection efficiency versus line scan position of the V-roof mirror box light collector was measured. The collection efficiency had the shape shown by the line labeled 54 in FIG. 11. A local light collection efficiency peak is apparent at the center of the light collector. To remove the appearance of this local collection efficiency peak, a mask 56 of light absorbing tape was placed over the reflective surface of the upper roof mirrors to reduce the response of the collector at the center. The resulting collection efficiency curve is illustrated by the dashed line labeled 54' in FIG. 11.

Figure 10:
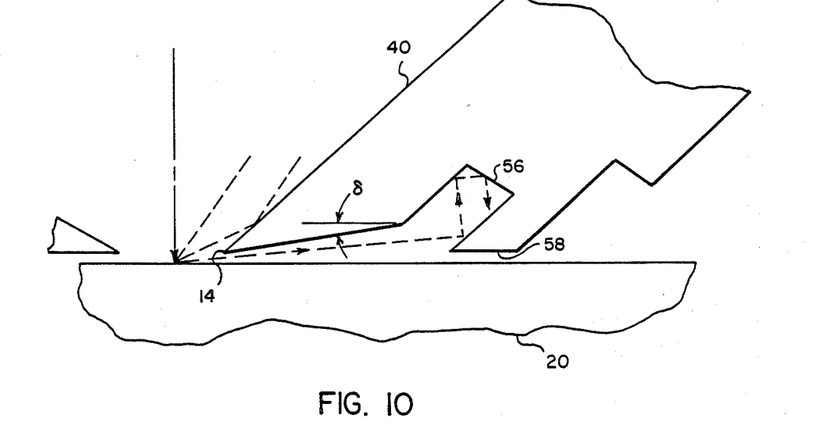
FIG. 10 is a partial cross-sectional view of a light trap according to a further aspect of the present invention.

To reduce the effect of predischarge due to reflected stimulating radiation onto the surface of the photo-stimulable phosphor from the underside of the light collector, a light trap was provide on the edge of the bottom roof-mirror parallel to the slot 14. FIG. 10 shows a partial cross-section of the V-roof-mirror light collector and the light trap. The light trap is a slot 56 formed in the bottom edge of the mirror 40. The bottom edge of the mirror is provided with a relief angle $\delta$ to direct light impinging on the underside of the mirror between slot 14 and light trap 56 into the light trap. The surfaces of light trap 56 are coated with a matte black light absorbing coating. A gauging surface 58 is provided for measuring the height of the mirror box above a reference surface, and for absorbing any inadvertent contact with the surface of the phosphor without destroying the knife edges of slot 14.

To achieve maximum light collection efficiency, the knife edges of slot 14 and the gauging surface 58 should lie in the same plane. In practice however, to reduce the potential for damage of the knife edges of slot 14, the gauging surface was extended below the knife edge of slot 14 by 0.05 mm.

During the primary scanning of the phosphor sheet, the light trap feature is only necessary on the side of the slot upstream of the page scan direction, since the downstream side of the photo-stimulable phosphor sheet has already been discharged by the scanning operation. However, to allow the scanner to be operated in either direction and to reduce prestimulation during any prescan operation, a light trap was provided on both sides of the slot 14.

Although the features providing light traps parallel to the bottom slot to reduce predischarge has been described with respect to the V-roof-mirror light collector, this inventive feature is equally applicable to any light collector where reflections from portions of the collector could cause predischarge of the phosphor surface. For example, in the case of the prior art light collector of the type shown in U.S. Pat. No. 4,346,295, having a sheet light guide, with a flat edge positioned near the scan line, stimulating radiation reflected from the surface of the phosphor may be specularly reflected from the light guide back on to the surface of the photo-stimulable phosphor sheet to cause discharge.

Figure 12A:
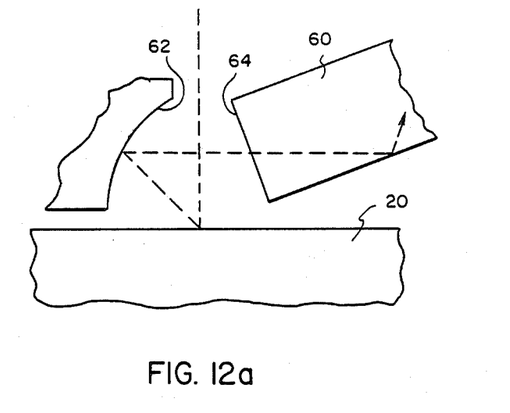
FIGS. 12a, 12b, 12c are a partial cross-sectional views illustrating the application of some aspects of the present invention to a prior art light collector.
Figure 12B:
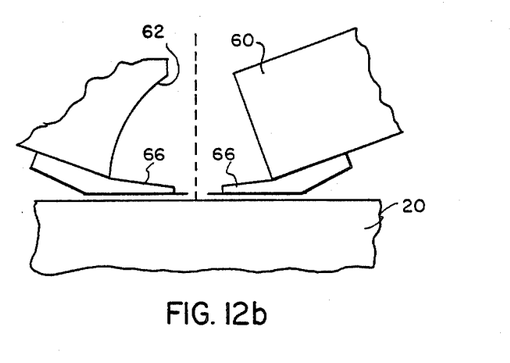

FIG. 12a shows a partial cross-section of such a light collector, showing the end of the light guide 60, and a mirror reflector 62 for directing emitted light to the light receiving face 64 of the light guide. A mask 66 may be provided between the bottom edge of the mirror 62 and the light guide 60 as shown in FIG. 12b to reduce prestimulation.

Figure 12C:
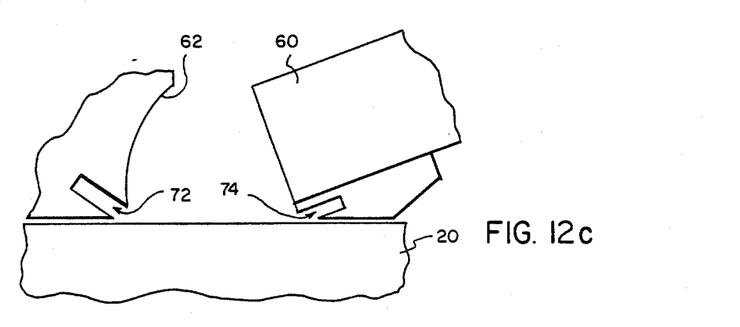

Alternatively, light traps 72 and 74 may be provided parallel to the bottom of mirror 62 and light guide 60, as shown in FIG. 12c to reduce predischarge in a manner analogous to the light traps provided for the V-roof-mirror light collector described above.

Figure 13:
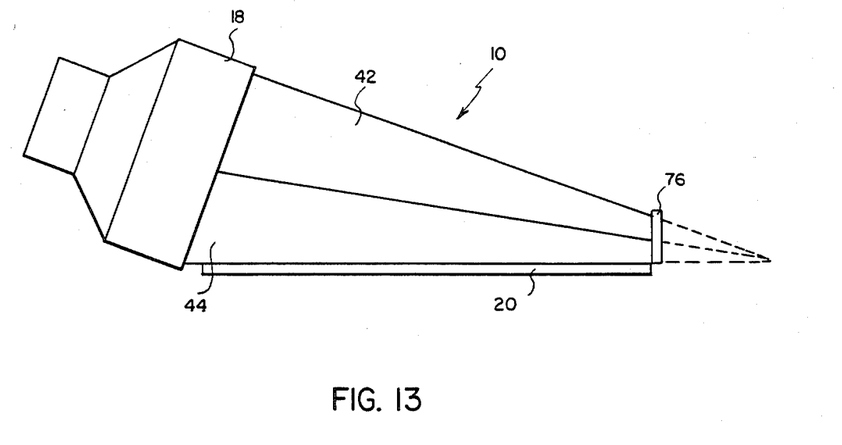
FIG. 13 is a side view of a roof-mirror light collector according to an alternative mode of practicing the invention.

In the preferred mode of carrying out the invention described above, the roof-mirror light collector was tapered toward the middle of the collector, with a light detector located at both ends of the light collector. Alternatively, the light collector may be tapered from one end to the other with a light detector at only the large end of the collector. A side view of such a roof-mirror light collection having only one light detector 13 is shown in FIG. 13. The narrow end of the light collector 10 may be capped with a mirror 76, or alternatively, the light collector 10 may extend to a point as shown by the phantom lines in FIG. 13.

INDUSTRIAL APPLICABILITY AND ADVANTAGES

The roof-mirror light collector is useful in a photo-stimulable phosphor scanning apparatus. It has the advantages of high light collection efficiency, and ease of manufacture. The prestimulation and predischarge reducing aspects of the present invention are also applicable in other types of light collectors having reflective surfaces forming a light collective enclosure.

I claim:

1. A mirror box light collector for collecting and detecting light emitted from a photo-stimulable phosphor sheet scanned by a beam of stimulating radiation, characterized by:
   a. a bottom roof-mirror extending the width of the photo-stimulable phosphor sheet, and defining a slot along the peak of the roof-mirror for passing a scanning beam to the surface of the photo-stimulable phosphor sheet and for allowing light emitted by the photo-stimulable phosphor sheet to enter the collector,
   b. a top roof-mirror positioned over the bottom roof-mirror to define a mirror box having a nearly square cross-section, said top roof-mirror defining a slot along its peak with its centerline coplanar wih the centerline of the slot in said bottom roof-mirror, said slot defined by said top roof-mirror being as wide as or wider than said slot defined by said bottom roof-mirror, for passing a scanning beam through the mirror box to said slot in said bottom roof-mirror said top and bottom roof-mirrors being tapered so that the nearly square cross-section of the mirror box is largest at at least one end of the mirror box;
   c. photodetector means having a light receiving face located at the large end of the mirror box, for receiving light emitted by the photo-stimulable phosphor sheet and generating an electrical signal in response thereto; and
   d. a filter for absorbing reflected stimulating radiation, positioned over the light receiving face of the photodetector means, said filter defining a peak aligned with said top and bottom slots in said roof-mirrors, for deflecting reflected stimulating radiation away from said bottom slot.

2. A mirror box light collector for collecting and detecting light emitted from a photo-stimulable phosphor sheet scanned by a beam of stimulating radiation, characterized by:
   a. a bottom roof-mirror extending the width of the photo-stimulable phosphor sheet, and defining a slot along the peak of the roof-mirror for passing a scanning beam to the surface of the photo-stimulable phosphor sheet and for allowing light emitted by the photo-stimulable phosphor sheet to enter the collector,
   b. a top roof-mirror positioned over the bottom roof-mirror to define a mirror box having a nearly square cross-section, said top roof-mirror defining a slot along its peak with its centerline coplanar with the centerlne of the slot in said bottom roof-mirror, said slot defined by said top roof-mirror being as wide as or wider than said slot defined by said bottom roof-mirror, for passing a scanning beam through the mirror box to said slot in said bottom roof-mirror said top and bottom roof-mirrors being tapered from the middle toward both ends so that the nearly square cross-section at the middle of the light collector is smaller than the nearly square cross-section at either end;
   c. first and second photodetector means having light receiving faces located respectively at each end of the mirror box, for receiving light emitted by the photo-stimulable phosphor sheet and generating an electrical signal in response thereto; and
   d. a mask located on the top roof-mirror at the center of the collector, to eliminate a local maximum response of the light collector at the center of the collector.

3. A mirror box light collector for collecting and detecting light emitted from a photo-stimulable phosphor sheet scanned by a beam of stimulating radiation, characterized by:
   a. a bottom roof-mirror extending the width of the photo-stimulable phosphor sheet, and defining a slot along the peak of the roof-mirror for passing a scanning beam to the surface of the photo-stimulable phosphor sheet and for allowing light emitted by the photo-stimulable phosphor sheet to enter the collector,
   b. a top roof-mirror positioned over the bottom roof-mirror to define a mirror box having a nearly square cross-section, said top roof-mirror defining a slot along its peak with its centerline coplanar with the centerline of the slot is said bottom roof-mirror, said slot defined by said top roof-mirror being as wide as or wider than said slot defined by said bottom roof-mirror, for passing a scanning beam through the mirror box to said slot in said bottom roof-mirror said top and bottom roof-mirrors being tapered so that the nearly square cross-section of the mirror box is largest at at least one end of the mirror box;
   c. photodetector means having a light receiving face located at the large end of the mirror box, for receiving light emitted by the photo-stimulable phosphor sheet and generating an electrical signal in response thereto; and
   d. a light trap adjacent the slot in the bottom roof-mirror for preventing reflected stimulating radiation from being re-reflected onto the stimulable phosphor so as to reduce predischarge of the stimulable phosphor.

4. A light collector for collecting and detecting light emitted by a photo-stimulable phosphor sheet, scanned by a beam of stimulating radiation, said light collector having a light collecting enclosure defining a pair of coplanar slots for passing a scanning beam of stimulating radiation to the photo-stimulable phosphor, and one of said slots being positioned adjacent the surface of the photo-stimulable phosphor sheet for admitting light emitted by the photo-stimulable phospshor into the light collecting enclosure, characterized by: light trap means adjacent said one slot for reducing the predischarge of the phosphor sheet by stimulating radiation reflected from the light collector.

5. The light collector claimed in claim 4, wherein said light trap means comprises a light trap slot coated with a light absorbing material.

* * * * *